Feb. 18, 1964  G. E. E. BLOMBERG  3,121,271
FASTENING ARRANGEMENT FOR TARPAULINS
Filed Aug. 5, 1960
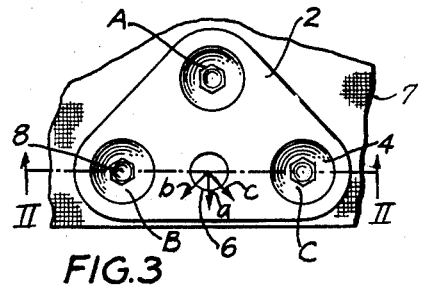
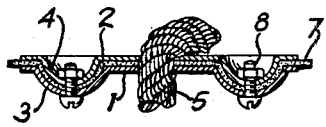
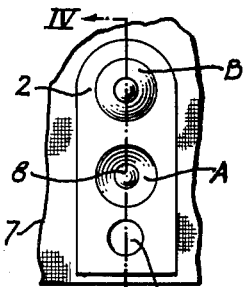
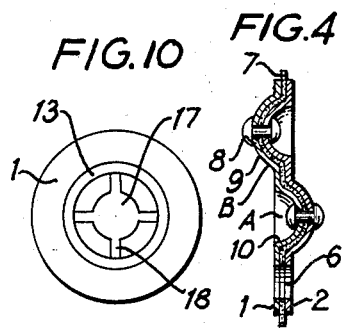
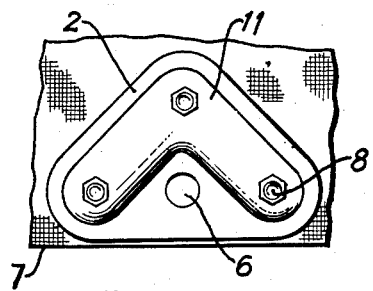
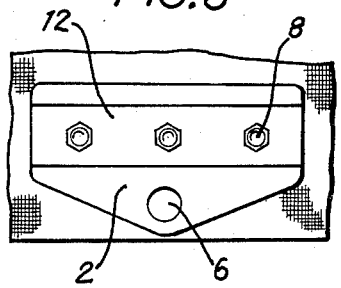
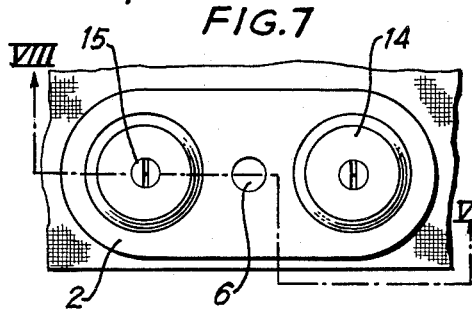
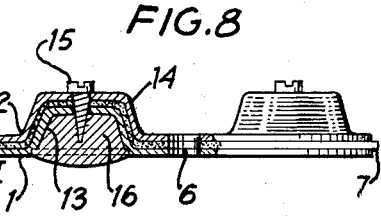
INVENTOR
GÖTE EINAR ERLING BLOMBERG
BY Toulmin & Toulmin
ATTORNEYS

United States Patent Office 3,121,271
Patented Feb. 18, 1964

3,121,271
FASTENING ARRANGEMENT FOR TARPAULINS
Göte Einar Erling Blomberg, Vastergatan 3A,
Goteborg, Sweden
Filed Aug. 5, 1960, Ser. No. 47,776
Claims priority, application Sweden Aug. 14, 1959
5 Claims. (Cl. 24—141)

Tarpaulins or other protective covers for various purposes made of cloth or plastic are normally, when in use, held in their covering position by tightened ropes, etc. Commonly eyelets or grommets which are attached to the tarpaulin, are used for inserting and fastening the ropes. Such grommet attachments have, however, not proved to be sufficiently strong, despite reinforcements of the cloth and its edges. The cloth is still subjected to wear and tear when pulled with great force.

The object of the present invention is to eliminate such disadvantages by replacing said attachments by clamp-plates or the like secured to the canvas, so as to distribute in a more favorable manner the pulling forces acting upon the attachment in the canvas and to provide improved securing of the canvas to the attachments. Due to the particular construction of these clamp-plates, a particularly advantageous attachment of these clamp-plates to the canvas is obtained without damage or any tendency to tear the canvas.

The invention essentially comprises an attachment which consists of two clamp-plates or shanks of a clamp-hoop, etc., working together as rope-holders, and which at certain points are provided with mutually opposing bulges and depressions, which are arranged to engage each other in such a way that, upon pressing of the clamp-plates against each other, the interposed canvas changes its shape, forming bulges and depressions. This pressing of the plates against each other is obtained by means of bolts, rivets or the like arranged in or in the vicinity of the bulges or depressions. In this way one obtains a very effective tightening and clamping of the canvas, especially in the said depressions and bulges, i.e., exactly where the canvas has its greatest change of shape and thus at places where the strongest clamping forces can be obtained.

In the accompanying drawings a specific embodiment and modifications of the present invention are shown.

FIGURE 1 is a top plan view of a grommet according to the present invention and attached near the edge of a tarpaulin;

FIGURE 2 is a sectional view taken along the lines II—II of FIGURE 1 and showing a rope inserted through the grommet opening;

FIGURE 3 is a top plan view of a modification of the present invention;

FIGURE 4 is a sectional view taken along the lines IV—IV of FIGURE 3;

FIGURE 5 is a top plan view of a further modification of this invention;

FIGURE 6 is a top plan view of still another modification of the grommet of this invention;

FIGURE 7 is a top plan view of still another modification wherein the clamp plates have protrusions with the shape of a frustum of a cone;

FIGURE 8 is a sectional view taken along the line VIII—VIII of FIGURE 7;

FIGURE 9 is a sectional view through one of the protrusions of the modification of FIGURE 7, with a bottom clamp plate being modified by the inclusion of slots; and FIGURE 10 is a top plan view of the outward protrusion of the bottom clamp plate shown in FIGURE 9.

In all of the figures the same reference numerals are used for the same structural details.

The rope attachment according to the invention preferably consists of two clamp-plates which fit to each other and which are preferably made of plastic, one base plate 1 with depressions 3, and a top plate 2 with corresponding bulges 4, between which the canvas 7 is placed and clamped. These plates are also provided with an open hole 6 for the rope 5 which is to be attached to the canvas.

In the arrangements illustrated in FIGS. 1–4 and 7–10 the clamping parts of the plates consist of bowl-shaped depressions and corresponding protrusions, which have been placed at certain points, while in the other illustrated ararngements, these depressions and bulges have been extended or joined with each other so as to form grooves and corresponding tongues. In every modification, the bulges and depressions have a shape corresponding to each other so as to fit into each other, thus enabling the canvas to be squeezed into these depressions so that it may be firmly held.

In the arrangement illustrated in FIGS. 1 and 2, the clamp-plates 1 and 2 which fit together, are triangular and preferably formed with two shorter side edges of equal length. The base plate 1 is provided, close to each corner, with a bowl-shaped depression 3, and the top plate 2 with a corresponding bulge 4 which is directed downwards. The open hole 6, which passes right through both plates, and which is intended for the rope, 5, is placed between the two depressions, which are situated close to the long side of the triangle. After the plates have been placed in their positions on each side of the canvas 7, one has to cut open the canvas through the hole 6, in order to allow the rope to be pulled through. At each point of attachment A, B, C, that is, where there is a depression and a corresponding bulge, a bolt 8 with a tightening nut has been attached. The bolt may be sharply pointed to allow it to penetrate the canvas.

In the position where the long side of the plates lies parallel with the edge of the canvas, this modification of the rope-plate has the advantage of a very firm fixing of the canvas even if the direction of the tractional strength varies within 90°, as shown in FIG. 1 by a central arrow $a$, and two side arrows $b$ and $c$. In the direction $a$ of the arrow which is perpendicular to the edge of the canvas, all three points of attachment have full counter-action against the traction power, and in the directions $b$ and $c$, where one has as much as 45° deviation, two of them show full efficiency. In this arrangement, the plates thus combine a limited requirement for space and great tenacity.

In the arrangement illustrated in FIGS. 3 and 4, the plates are of a long, substantially rectangular shape. One of the short sides is in parallel position to the edge of the canvas and the rope-hole 6 is placed close to this short side. Two points of attachment A and B are placed along the longitudinal axis of the plates in line with the rope hole and behind each other. The bowl-shaped points of attachment have the same arrangement as described above but rivets are used instead of bolts. This modification discloses that such alternating overturned bowl-shapes can be used. The base-plate 1 has a depression 10 at the point of attachment A, and an outward bulge 9 at the other point of attachment B, and the top plate is shaped correspondingly.

In the modification illustrated in FIG. 5, the grip places of the plates shown in FIG. 1 have been extended in order to form a rectangular groove in the base plate, and a corresponding overturned outward bulge 11 in the top plate, tightening bolts 8, fitted as in FIG. 1, being preferably used.

The modification illustrated in FIG. 6 shows a straight groove engaging a corresponding overturned outward bulge 12.

FIGS. 7 through 10 show modifications with an altered bowl-shape, by which the retention power is increased. Here the clamp plates are shown as long-shaped plates with one of their long edges parallel to the edge of the canvas.

In FIGS. 7 and 8, the plates have two points of attachment with the rope hole 6 being positioned therebetween. The base plate 1 has, at each point of attachment, an outward bulge 13 turned upwards, in the shape of the frustum of a cone, and the top plate 2 a corresponding overlying depression 14, between which the canvas is secured under considerable change of shape. The angle formed between the generatrix of the cone-side and the base-area is rather large and depends to a certain extent on the thickness and the stiffness of the canvas. The angle should preferably be between 60° and 90°. Due to the rather steep cone-side the canvas is held with an exceptionally great power of retention. The plates are held together at each point of attachment by means of a centrally situated conical tightening screw 15. When this screw is screwed in, it pulls a cone-shaped nut 16 into the outward bulge of the base plate 1 and presses this into the depression of the top plate 2, which results in a simultaneous tightening and form-changing of the interposed canvas. The nut 16 should be preferably made of such a soft and elastic plastic material, that the screw, when tightened, forces the nut sidewards against the wall of the bulge.

FIGS. 9 and 10 show an alternative to this arrangement, where the outward bulge of the base plate is provided with an extended top hole 17, which surrounds the screw, the wall of the bulge being further opened by slots 18 so as to form wall sectors. The nut 16 is then provided with a top-end that matches the hole. When the screw is tightened the nut presses the wall sectors against the canvas and the top end of the nut protrudes through the hole and thus is pressed directly against the canvas.

All illustrations of modifications are adaptable for thin as well as thick tarpaulin materials, and the clamps will withstand severe pulling forces while still sparing the canvas. The attachment of the tightening bolts, tightening screws or nuts contributes considerably to the very great clamping effect of the plates holding the canvas.

It will be understood that this invention is susceptible to modification in order to adapt it to different usages and conditions and, accordingly, it is desired to comprehend such modifications within this invention as may fall within the scope of the appended claims.

What I claim is:

1. A grommet for tarpaulins comprising in combination, two clamp plates adapted to be laid one on each side of the canvas of the tarpaulin, there being an aperture formed in each of said clamp plates with an edge adapted to cooperate with attachment means for the tarpaulin, tightening means outside said apertures for firmly holding said clamp plates together against the canvas of the tarpaulin, and a plurality of transmission agents in said clamp plates in the form of depressions and protrusions mutually opposing each other and being of corresponding shape, each of said depressions and protrusions having a depth exceeding the thickness of the tarpaulin and further having a closed circumference surrounding said tightening means, said depressions and protrusions being adapted to change the shape of the interposed canvas so as to make said canvas form depressions when the clamp plates are tightened by the aid of said tightening means so as to be able to transmit the forces from the attachment means to substantial surface parts of the tarpaulin and in all directions thereof.

2. A grommet for tarpaulins according to claim 1 with said grommet being made of plastic.

3. A grommet for tarpaulins according to claim 1 in which said tightening means are rivets.

4. A grommet for tarpaulins according to claim 1 with the depressions and protrusions in said clamp plates being bowl-shaped, and the tightening means being placed centrally in each depression and matching protrusion.

5. A grommet for tarpaulins according to claim 1 with the depressions and protrusions in said clamp plates having the shape of the frustum of a cone, and the tightening means being placed centrally in each depression and matching protrusion.

References Cited in the file of this patent

UNITED STATES PATENTS

| | | |
|---|---|---|
| 659,981 | McCall | Oct. 16, 1900 |
| 893,984 | Danner | July 21, 1908 |
| 1,825,029 | Trüb | Sept. 29, 1931 |
| 2,562,005 | Wenzel et al. | July 24, 1951 |